Sept. 11, 1923. Re. 15,684

E. A. SUVERKROP

LAPPING MACHINE

Original Filed March 23, 1917

Inventor
Edward A. Suverkrop
Hy. Hart
his Attorney

Reissued Sept. 11, 1923. Re. 15,684

UNITED STATES PATENT OFFICE.

EDWARD A. SUVERKROP, OF SEA CLIFF, NEW YORK; JENNY HAMILTON SUVERKROP, ADMINISTRATRIX OF SAID EDWARD A. SUVERKROP, DECEASED, ASSIGNOR TO JENNY HAMILTON SUVERKROP, OF SEA CLIFF, NEW YORK.

LAPPING MACHINE.

Original application filed March 23, 1917, Serial No. 156,853. Renewed January 2, 1918, Serial No. 210,072. Original No. 1,257,046, dated February 19, 1918. Application for reissue filed January 16, 1920. Serial No. 351,956.

*To all whom it may concern:*

Be it known that I, EDWARD A. SUVERKROP, a citizen of the United States, residing at Sea Cliff, in the county of Nassau and State of New York, have invented a new and useful Improvement in Lapping Machines, of which the following is a specification.

This invention relates to the making of gage blocks and the like metal pieces which are required to be very accurate as to thickness, and as to the parallelism, flatness and smoothness of their opposite surfaces.

The object of the present invention is to provide mechanism which will lap hard metal in such manner that gage blocks as satisfactory as standard hand made gages can be produced, having extremely accurate dimensions and parallel, flat and smooth opposite surfaces, in a short time with a minimum amount of labor and by relatively unskilled persons.

Broadly, apparatus for attaining this end has two flat lapping plates either made of or charged with abrasive material, and one or both being movable toward and from the other, with means for guiding and maintaining these lapping plates against rotation, means for setting the lapping plates a positive distance apart and insuring their stopping when approaching at an exact distance from each other, a work plate for holding the pieces to be lapped between the lapping plates, and mechanism for imparting relative compound movement or movement in more than one direction between the work plate and the lapping plates, and desirably at different speeds, in order that every portion of the surfaces to be lapped shall be subjected to the action of the entire lapping surfaces, and thus eliminate materially the wear of the laps and reduce any heating or peening effect and insure uniform abrasion of the pieces lapped so that the product will be extremely acurate in dimensions, parallelism, flatness and smoothness and yet be relatively cheap.

The upper lap plate moves towards the lower one solely under the force of gravity, this being of advantage in that the rate at which the upper plate moves is determined by the rate at which the lapping operation proceeds and the upper plate is free to drop so that the stops, hereinafter described, become effective at the termination of the lapping operation to insure parallelism of the lapping surfaces.

Figure 1:
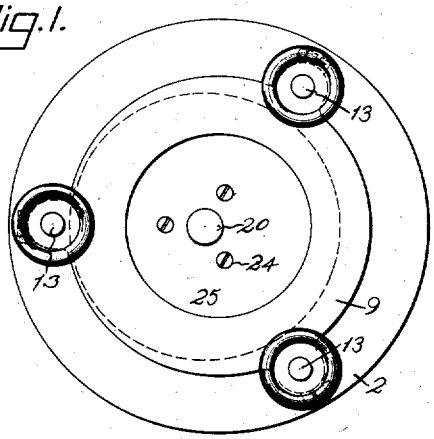
Figure 1 shows a plan of a machine that embodies the invention, in which the lap plates are annular and stationary while the work holding plate is circular and is rotated rapidly on an axis that is revolved slowly so that the lapped pieces will travel in an hypocycloidal path between the lapping surfaces of the lap plates.
Figure 3:
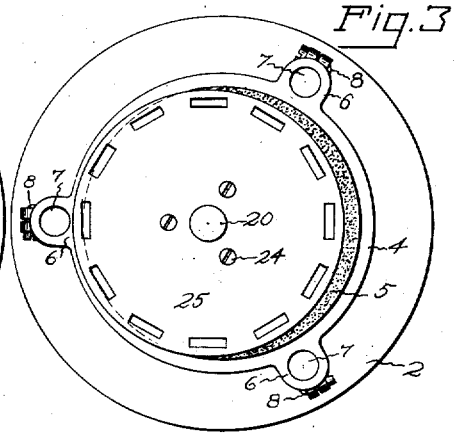
Fig. 3 shows a plan with the upper lap plate removed.
Figure 2:
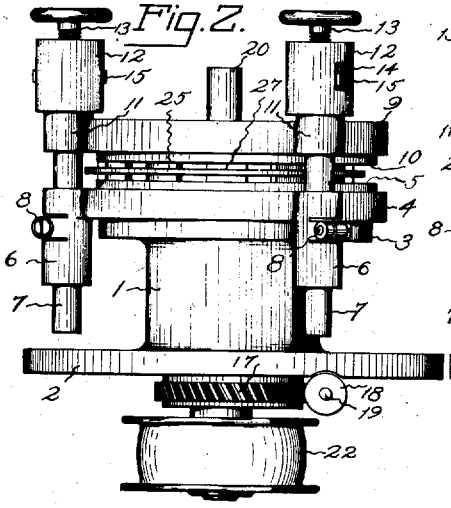
Fig. 2 shows a side elevation of this machine.
Figure 4:
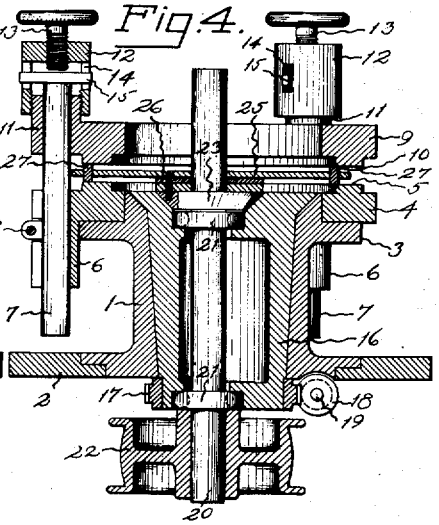
Fig. 4 shows a central vertical section of the machine.

The machine illustrated has a cylindrical casing 1 mounted on a stationary bed 2. Resting on a flange 3 near the upper end of the casing is the annular lower lap plate 4. The upper surface 5 of this lap plate may be formed of or charged in the usual way with abrasive material. At three points about the sides of the lower lap plate are hubs 6 with vertical bores. In these bores and extending upwardly from the hubs are guide posts 7 that may be secured with their upper ends at any desired height by clamps 8.

The annular upper lap plate 9, which has its lower surface 10 formed of or charged with abrasive material, has hubs 11 with vertical bores that have a sliding fit on the guide posts which are clamped in the hubs of the lower lap plate. Sleeves 12 are shown as screwed onto the upper ends of the hubs 11, and turning in the top ends of these sleeves toward and from the upper ends of the guide posts are micrometer stop screws 13. Openings 14 are made transversely through the sleeves so that the upper ends of the guide posts and the lower ends of the stop screws may be observed and standard gage blocks 15 placed between these parts.

In the tapering bore of the casing a rotatable conical sleeve 16 is fitted. This sleeve may be rotated in the casing by any suitable means as, for instance, it may have on its lower end a spiral gear or worm wheel 17 engaged by a spiral pinion or worm 18 on a shaft 19 that may be driven by any convenient means so as to rotate the conical sleeve slowly. Extending through the rotatable sleeve and having its axis eccentric with relation to the axis of the sleeve is a shaft 20. Anti-friction bearings 21 may be provided for supporting this shaft in the sleeve. On the lower end of the eccentric shaft is a pulley 22 which may be driven by any convenient means so as to rotate the shaft rapidly. Fixed on the shaft at the upper end of the sleeve is a collar 23 and fastened to this by any suitable means, as screws 24, is the work holding plate 25. Washers 26 are located on the shaft between the collar and work plate so as to locate the work plate in proper position for efficient service between the lower and upper lap plates. The work plate in this type of machine is circular and is provided with a number of recesses arranged annularly near its periphery, and in these recesses are placed the pieces or blocks 27 to be lapped.

In using the machine illustrated before the work plate is placed in position the upper lap plate is placed on the guide posts with its lapping surface resting flatly on the lapping surface of the lower lap plate. With the lap plates together in this manner the stop screws are turned down until they impinge on the upper ends of the guide posts. The upper lap plate is then lifted off and the work plate secured in position on the shaft with the pieces to be lapped in the openings provided therefor, after which the upper lap plate is again put in place on the guide posts and standard gage blocks of the thickness to which the blocks carried by the work plate are to be reduced by lapping are placed between the upper ends of the guide posts and the lower ends of the stop screws. As the blocks to be lapped are, of course, over size the lower ends of the stop screws are a slight distance above the tops of the standard gage blocks on the upper ends of the guide posts. After the machine has been set in operation the work plate is rotated rapidly by means of the pulley and shaft and at the same time the sleeve is rotated slowly by means of the spiral gears. This carries the axis of the rapidly rotating shaft slowly around in a circle, the radius of which is equal to the distance between the axis of the sleeve and the axis of the solid shaft. As a result of these motions the work plate is, while rapidly rotated, slowly revolved so that the pieces being lapped, while carried rapidly around between the lapping surfaces of the two lap plates, are slowly carried in and out between the inner and outer edges of the lapping surfaces of the lap plates and because of this movement the pieces to be lapped probably do not traverse precisely the same path a second time and therefore their path of travel may be conveniently described as constantly changing or undefined. By means of this all the surfaces lapped are subjected to every portion of the lapping surfaces. The lapping is continued until as the pieces are worn away the lower ends of the micrometer screws reach and impinge upon the upper surfaces of the standard gages on the guide posts, then, of course, as the upper plate can descend no farther the lapping of the pieces ceases.

Figure 5:
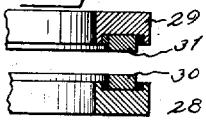
Fig. 5 shows a section of portions of two annular plates that may be used on the machine for preliminary lapping and grinding and bringing the pieces to be lapped to approximate size.

With this type of machine both the upper and lower lap plates, the lapping surfaces of which are made of or charged with hard granular abrasive material, may be removed and the machine provided with lapping or grinding plates, such as shown in Fig. 5, for preliminary grinding. In this case the lower and upper plates 28 and 29 may be grooved and rings of India oil stone 30 and 31 or other suitable grinding material may be cemented in the grooves of the rings. With the machine set up in this way the pieces to be formed into gage blocks, and which have previously been hardened and ground on a surface grinder to, say, within .001 of an inch of finished size, may be lapped so as to bring the pieces to approximately .0001 or .0002 of an inch over the finished size. The pieces having been reduced to this size are then lapped in the same machine provided with the lap plates first described or in another machine provided with such lap plates and reduced to finished size. In apparatus embodying this invention pieces have been lapped very rapidly to less than .00005 of an inch of absolute dimension and parallelism.

With these machines a number of blocks may at the same time be by relatively unskilled labor quickly reduced to the dimensions of standard gage blocks without danger of the blocks curling, because both sides are heated and peened equally and simultaneously, and this insures that their opposite surfaces be smooth, flat planes that are parallel.

In accordance with the provision of the Patent Statutes, I have described the principle of operation of my invention together with the apparatus which I now consider to represent the best embodiment thereof but I desire to have it understood that the apparatus shown is only illustrative and my invention is susceptible of various modifications and changes. For instance, other means than that shown may be employed to give such movement to the work plate that the pieces being lapped will move in a constantly changing path over the lapping surfaces so as to obtain the objects stated.

The invention claimed is:

1. A lapping machine having parallel lap plates with abrasive opposing surfaces mounted so the distance between them can be decreased, means for guiding the lap plates as they move one towards the other, adjustable stops for limiting the closing together of the lapping surfaces, a work plate between the lap plates, and means for imparting relative movement between the lap plates and the work plate in more than one direction, whereby the opposite surfaces of the pieces carried by the work plate will be subjected to the abrasive action of the lapping surfaces of the lap plates.

2. A lapping machine having parallel lap plates with flat abrasive opposing surfaces mounted so the distance between them can be decreased, means for guiding the lap plates as they move one towards the other, adjustable stops for limiting the closing together of the lapping surfaces, a work plate between the lap plates, and means for moving the work plate between the lap plates in more than one direction, whereby the opposite surfaces of the pieces carried by the work plate will be subjected to the abrasive action of the lapping surfaces of the lap plates.

3. A lapping machine having parallel lap plates with flat abrasive opposing surfaces mounted so the distance between them can be decreased, means for guiding the lap plates as they move one towards the other, adjustable stops for limiting the closing together of the lapping surfaces, a work plate between the lap plates, and means for imparting relative rotary movement between the lap plates and the work plate in more than one direction, whereby the opposite surfaces of the pieces carried by the work plate will be subjected to the abrasive action of the lapping surfaces of the lap plates.

4. A lapping machine having parallel lap plates with flat abrasive opposing surfaces mounted so the distance between them can be decreased, means for guiding the lap plates as they move one towards the other, adjustable stops for limiting the closing together of the lapping surfaces, a work plate between the lap plates, and means for rotating the work plate about its axis and revolving the axis of the work plate between the lap plates, whereby the opposite surfaces of the pieces carried by the work plate will be subjected to the abrasive action of the lapping surfaces of the lap plates.

5. A lapping machine having parallel lap plates with flat abrasive opposing surfaces, one lap plate being stationary and the other movable toward the stationary plate, guides for the movable plate mounted on the stationary plate, adjustable stops mounted on the movable plate for limiting the closing of said movable plate toward the stationary plate, a work plate between the lap plates, and means for rotating the work plate about its axis and revolving the axis of the work plate between the lap plates, whereby the opposite surfaces of the pieces carried by the work plate will be subjected to the abrasive action of the lapping surfaces of the lap plates.

6. A lapping machine having parallel removable annular lap plates with flat abrasive opposing surfaces mounted so the distance between them can be decreased, means for guiding the lap plates as they move one towards the other, adjustable stops for limiting the closing together of the lapping surfaces, a work plate between the lap plates, and means for rotating the work plate about its axis and revolving the axis of the work plate between the lap plates, whereby the opposite surfaces of the pieces carried by the work plate will be subjected to the abrasive action of the lapping surfaces of the lap plates.

7. A lapping machine having parallel removable annular lap plates with flat abrasive opposing surfaces mounted so the distance between them can be decreased, means for guiding the lap plates as they move one towards the other, adjustable stops for limiting the closing together of the lapping surfaces, a work plate between the lap plates, and means for rapidly rotating the work plate about its axis and slowly revolving the axis of the work plate between the lap plates, whereby the opposite surfaces of the pieces carried by the work plate will be subjected to the abrasive action of the lapping surfaces of the lap plates.

8. A lapping machine having non-rotatable lap plates with abrasive opposing surfaces movable one towards the other during the lapping operation, a work plate between said lap plates, and means for moving said work plate in a constantly changing path.

9. A lapping machine having non-rotatable parallel lap plates with abrasive opposing surfaces movable one towards the other during the lapping operation, a rotatable work plate between said lap plates, and means for moving the work plate in a constantly changing path.

10. A lapping machine having non-rotatable lap plates with abrasive opposing surfaces movable one towards the other during the lapping operation, a work plate between said lap plates, means for rapidly rotating said work plate about its own axis, and means for slowly revolving the axis of said work plate.

11. A lapping machine having a fixed non-rotatable horizontally disposed lap plate, a second non-rotatable lap plate movable under the force of gravity towards said first lap plate during the lapping operation, a work plate between said lap plates, and means for moving said work plate.

12. A lapping machine having an instrumentality comprising a pair of lap plates one movable under the force of gravity towards the other during the lapping operation, an instrumentality comprising a work holder positioned between said lap plates, means for holding one of said instrumentalities against rotation, and means for moving the other instrumentality in a constantly changing path.

13. A lapping machine having non-rotatable lap plates one movable towards the other under the force of gravity during the lapping operation, means for guiding the movable lap plate, a work plate between said lap plates, and means for imparting relative movement between said work plate and lap plates.

14. A lapping machine having a horizontally disposed non-rotatable lap plate, a second lap plate above the first one and movable towards the same under the force of gravity, means for guiding said movable plate, a work plate between said lap plates, and means for moving said work plate in a constantly changing path.

15. A lapping machine having lap plates movable one towards the other during the lapping operation, a work plate between said lap plates, means for imparting relative movement between said work plate and lap plates, and means for insuring parallelism of the lapping surfaces of said lap plates at the termination of the lapping operation.

16. A lapping machine having non-rotatable lap plates movable one towards the other during the lapping operation, a movable work plate between said lap plates, and means for insuring parallelism of the lapping surfaces of said lap plates at the termination of the lapping operation.

17. A lapping machine having lap plates movable one towards the other during the lapping operation, a work plate between said lap plates, means for imparting relative movement between said work plate and lap plates and adjustable means for insuring parallelism of the lapping surfaces of said lap plates at the termination of the lapping operation.

18. A lapping machine having non-rotatable lap plates movable one towards the other during the lapping operation, a work plate between said lapping plates, means for moving said work plate, and stops for limiting the closing together of said lap plates and insuring parallelism thereof at the termination of the lapping operation.

19. A lapping machine having a pair of parallel lap plates with abrasive opposing surfaces mounted so as to move one towards the other during the lapping operation, a work plate between said lap plates, means for imparting relative movement between said work plate and lap plates, and three angularly disposed stops for limiting the closing together of the lapping surfaces and insuring parallelism thereof at the termination of the lapping operation.

20. A lapping machine having lap plates movable one towards the other under the force of gravity during the lapping operation, a work plate between said lap plates, means for moving said work plate, and means for insuring parallelism of the lapping surfaces of said plates at the termination of the lapping operation.

21. A lapping machine having lap plates with opposing flat abrasive surfaces and mounted to freely adjust themselves as to parallelism, a work plate between said lap plates and having openings therein for blocks to be lapped, means for effecting relative bodily movement between said work plate and the lap plates, and stops for limiting the closing together of said lap plates.

EDWARD A. SUVERKROP.